(12) United States Patent
Spell

(10) Patent No.: US 6,898,858 B1
(45) Date of Patent: May 31, 2005

(54) FOLDING CONCEALED HACKSAW

(76) Inventor: Barry Spell, 218 E. Magnolia, Crowley, LA (US) 70526

( * ) Notice: Subject to any disclaimer, the term of this patent is extended or adjusted under 35 U.S.C. 154(b) by 10 days.

(21) Appl. No.: 10/639,567

(22) Filed: Aug. 12, 2003

(51) Int. Cl.[7] .............................................. B27B 21/02
(52) U.S. Cl. ........................................ 30/512; 30/507
(58) Field of Search .......................... 30/507, 512, 513, 30/506, 508, 509, 510, 511, 517, 519

(56) References Cited

U.S. PATENT DOCUMENTS

| | | | | |
|---|---|---|---|---|
| 1,380,628 A | * | 6/1921 | Barner | 30/512 |
| 1,429,195 A | * | 9/1922 | Donaldson | 30/512 |
| 1,565,861 A | * | 12/1925 | McIntire | 30/512 |
| 2,194,494 A | * | 3/1940 | Carroll | 30/506 |
| 2,309,816 A | * | 2/1943 | Allen | 30/512 |
| 2,532,506 A | * | 12/1950 | Mansfield | 30/511 |
| 2,595,288 A | * | 5/1952 | Peters | 30/512 |
| 2,910,101 A | * | 10/1959 | Canfield | 30/506 |
| 2,930,420 A | * | 3/1960 | Brion | 30/512 |
| 3,250,307 A | * | 5/1966 | Schmidt et al. | 30/512 |
| 4,499,936 A | * | 2/1985 | Nilsson | 30/512 |
| 5,208,986 A | * | 5/1993 | Ryon et al. | 30/506 |
| 5,706,585 A | * | 1/1998 | Wang | 30/512 |

* cited by examiner

Primary Examiner—Clark F. Dexter
(74) Attorney, Agent, or Firm—James M. Deimen

(57) ABSTRACT

A folding hacksaw having the back of the saw and the saw handle pivotally joined together and pivotally connected to a four-bar linkage comprising the blade, side frames and a back frame. The back frame is enclosed within the back of the saw. Movement of the handle relative to the back of the saw causes the saw blade to extend from the back or retract into the back in the manner of a folding knife. The movement of the handle places the handle in the proper cutting position when the blade is extended. A top latch maintains the handle in line with the back in the retracted position. A blade latch maintains the saw blade and the handle rigidly in the blade extended position.

18 Claims, 3 Drawing Sheets

FOLDING CONCEALED HACKSAW

BACKGROUND OF THE INVENTION

The field of the invention pertains to handsaws and, in particular, to foldable or collapsible wood saws or hacksaws.

Over the years, a wide variety of foldable or collapsible handsaws have been developed. U.S. Pat. No. 1,429,195 discloses a quadrilateral hacksaw frame having the saw handle attached to an intermediate location on one of the side frames. The side frames, as extended, form oblique angles to a back frame that is substantially shorter than the blade.

U.S. Pat. No. 1,565,861 discloses a hacksaw wherein the handle and side frames fold over the back frame, and the blade fits within the folded frames. In contrast, U.S. Pat. No. 2,309,816 discloses a hacksaw wherein the back frame and distal side frame slide into the handle, which forms the proximate side frame. The blade likewise slides into the handle.

U.S. Pat. No. 2,595,288 discloses a wood saw wherein the tubular side frames fold into a U-shaped back frame, and the blade slides into, and is completely enclosed by, the folded frame. U.S. Pat. No. 2,910,101 discloses a Swedish bucksaw wherein the back frame folds at the center and the side frames fold over the back frame pieces. U.S. Pat. No. 2,930,420 discloses a folding saw with a back frame substantially shorter than the blade wherein the side frames fold into the back frame and the blade extends through the frames.

U.S. Pat. No. 3,250,307 discloses a folding saw wherein the back frame folds into three pieces which fit into a carrying holster and the flexible blade fits into a special belt which also supports the holster. U.S. Pat. No. 5,208,986 discloses a bucksaw wherein the side frames fold over the back frame and the back frame includes a retaining device to hold the saw blade therein.

U.S. Pat. No. 5,369,887 discloses a powered coping saw wherein an internal linkage provides tension on the blade continuously as the blade reciprocates. U.S. Pat. No. 5,706,585 discloses a hacksaw wherein the back frame slides within the two side frames and the blade slides within the back frame.

SUMMARY OF THE INVENTION

The new saw is disclosed in the form of a hacksaw but can accommodate other saw blades for cutting other materials than metal. In the new saw, the back channel of the saw and the saw handle are pivotally joined together and pivotally connected to a four-bar mechanism comprising the blade, side frames and a back frame. The back frame is enclosed within the back channel of the saw. Movement of the handle relative to the back of the saw causes the saw blade to extend from the back or retract into the back. The movement of the handle places the handle in the proper cutting position when the blade is fully extended and a safety latch position maintains the blade and handle in a latched condition. Retraction of the blade places the handle in line with the back channel and the blade and mechanism within the back channel. A top latch position maintains the saw blade in the retracted position.

DESCRIPTION OF THE PREFERRED EMBODIMENT

Figure 1:
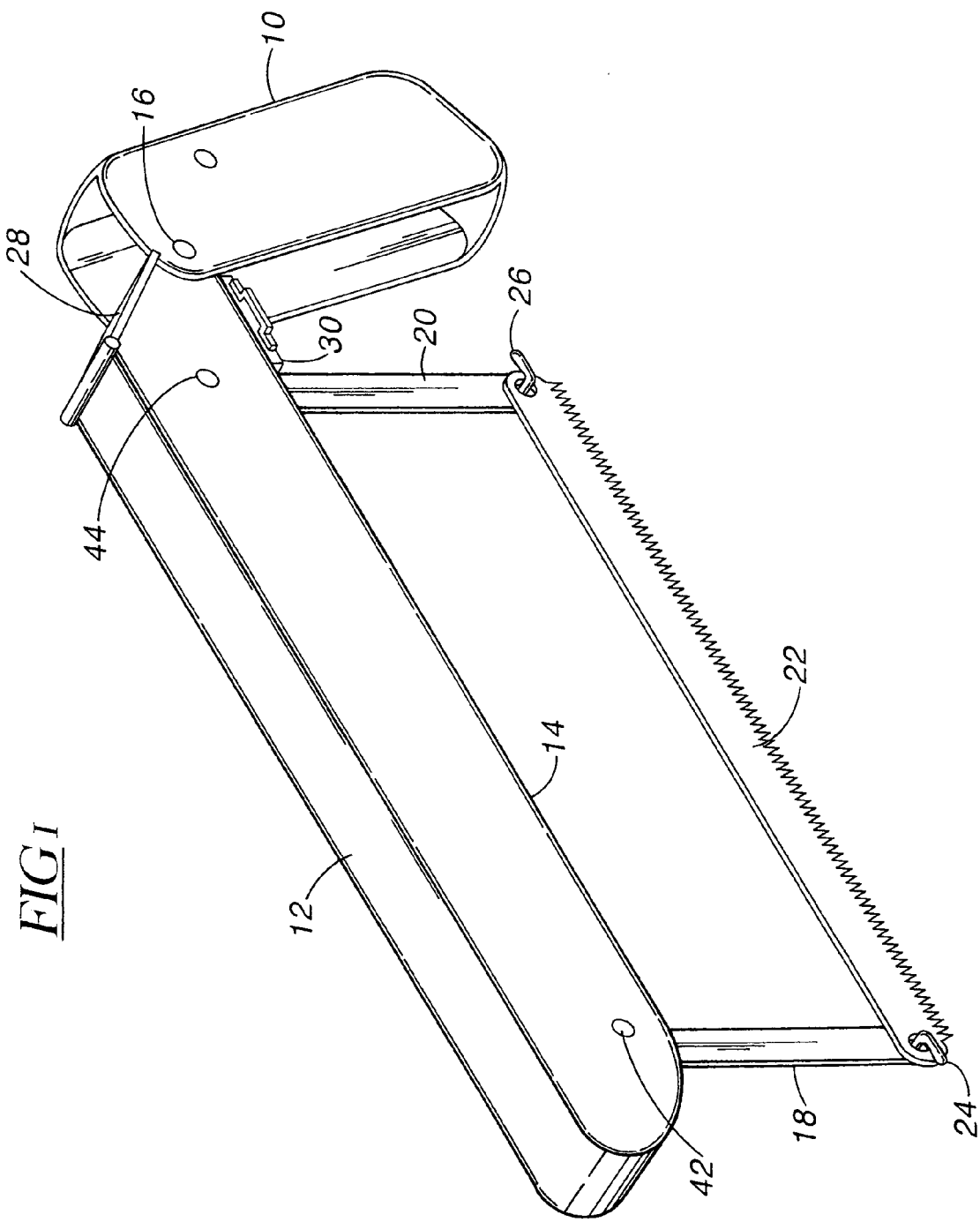
FIG. 1 is a perspective view of the new saw with the blade extended.
Figure 5:
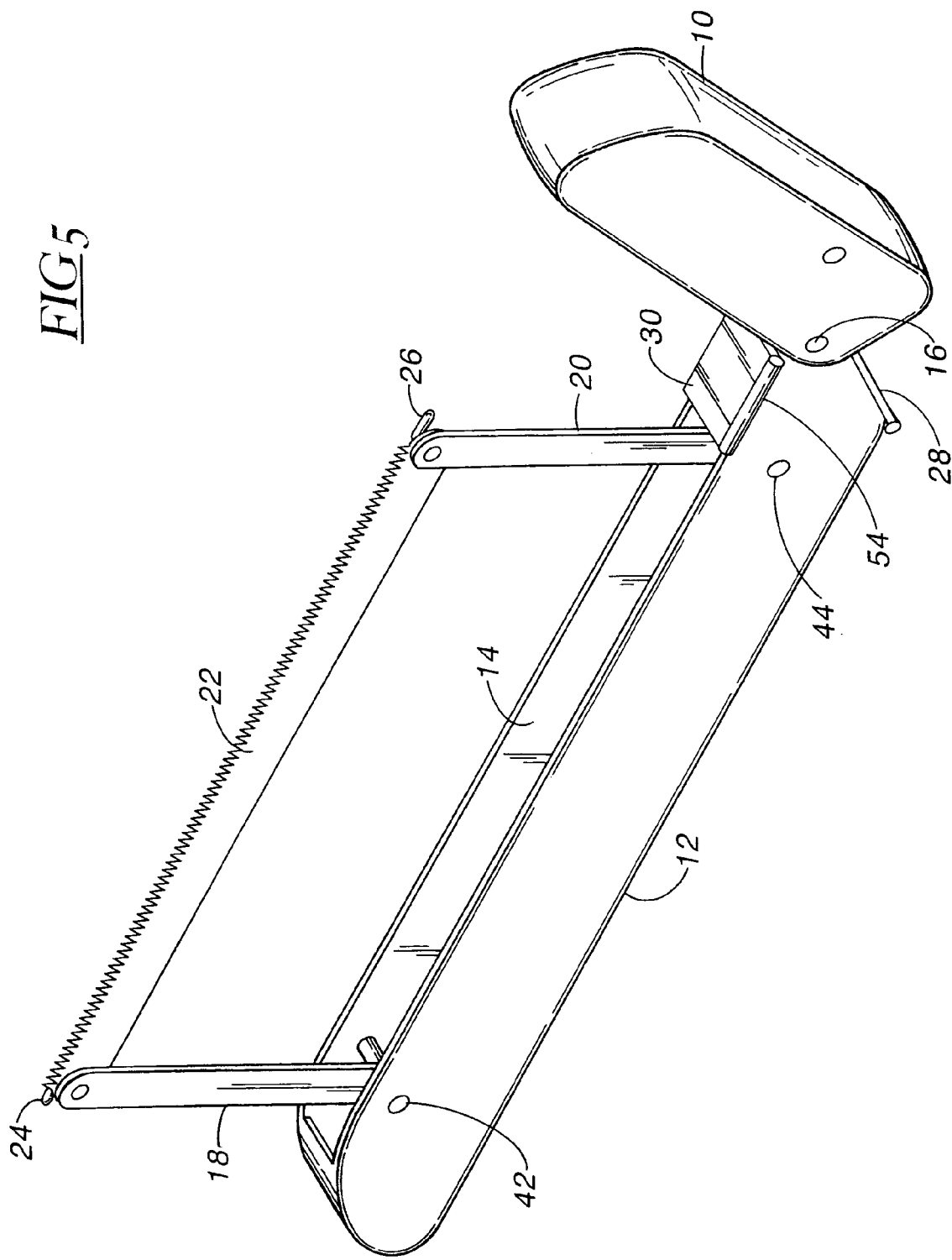
FIG. 5 is an upside-down perspective view of the saw with the blade fully extended.

Illustrated in FIGS. 1 and 5, is the saw comprising a handle 10 and a back channel 12 open on the underside 14. The handle 10 and back channel 12 are connected by a pivot at 16 on each side of the back. Extending from underneath the back channel 12 are side frames 18 and 20 connected to the saw blade 22 by hook pivots at 24 and 26. Also shown in FIGS. 1 and 5 are a top handle latch 28 and a blade latch 30.

Figure 2:
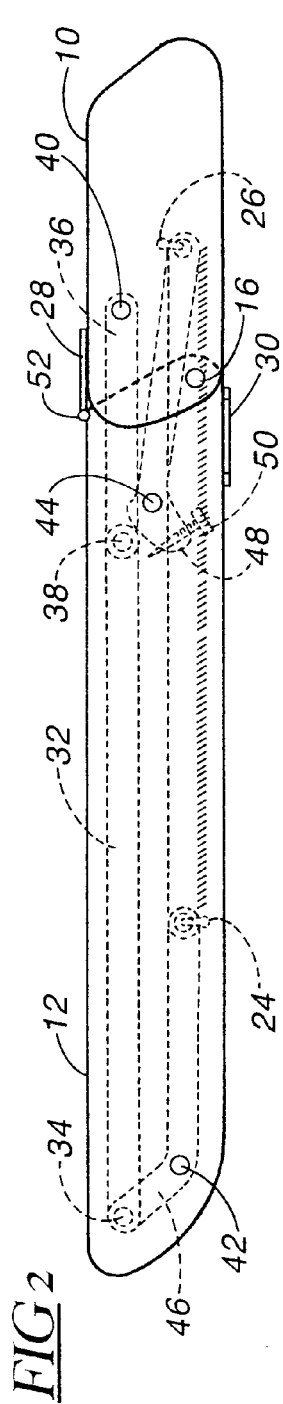
FIG. 2 is a side elevation of the saw with the blade retracted.
Figure 3:
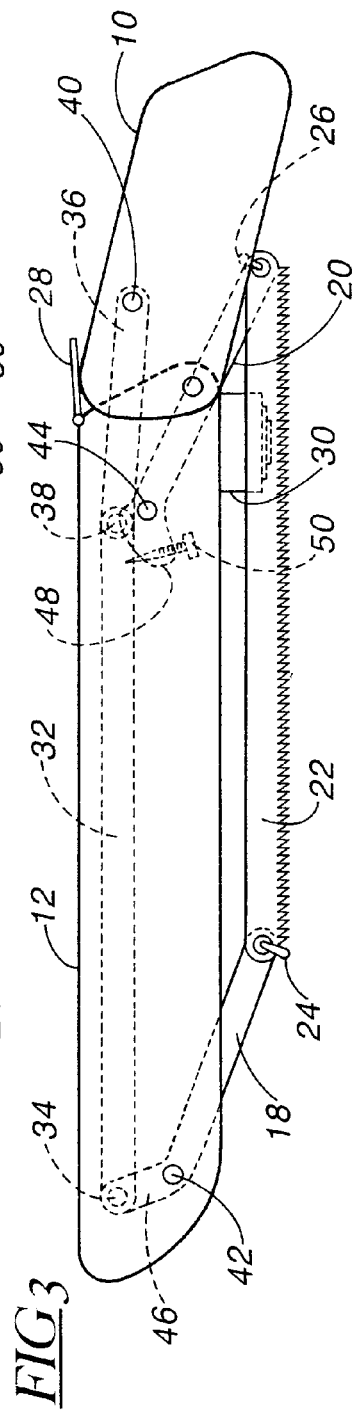
FIG. 3 is a side elevation of the saw with the blade partially extended.
Figure 4:
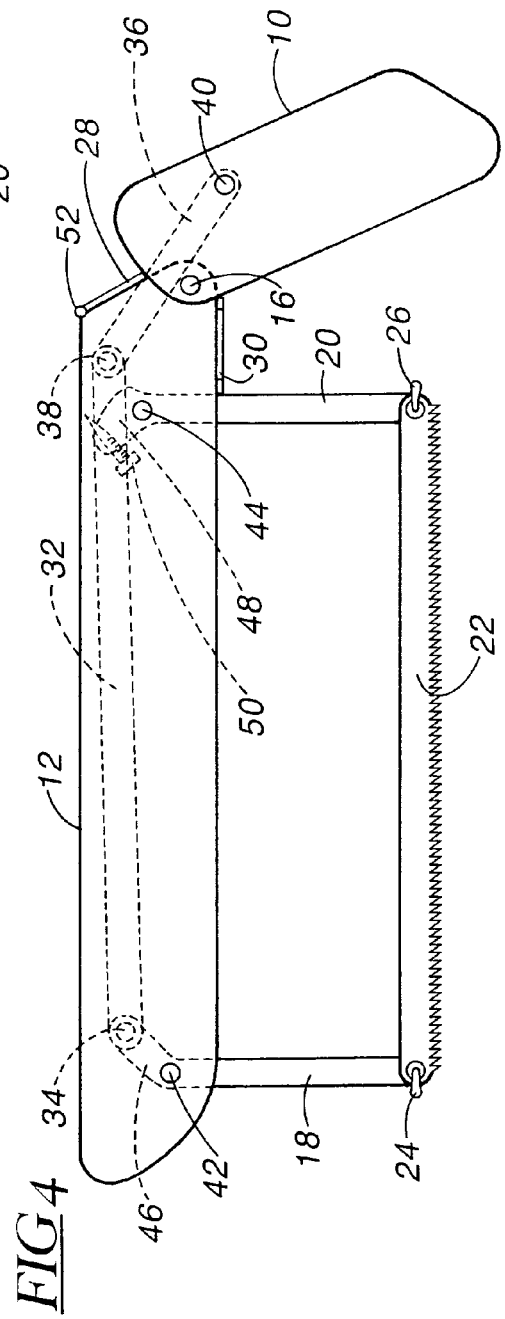
FIG. 4 is a side elevation of the saw with the blade fully extended.

In FIGS. 2, 3 and 4, the four-bar linkage of the mechanism is shown. The linkage comprises the blade 22, side frames 18 and 20 and back frame 32. Back frame 32 is connected to side frame 18 by a pivot at 34 and to handle link 36 by a pivot at 38. Handle link 36, in turn, is connected to handle 10 by a pivot at 40. To complete the linkage side frame 18 is connected to the back channel 12 by a pivot at 42 and side frame 20 is connected to the back channel 12 by a pivot at 44. Any suitable pivots, such as bolts, pins or rivets may be used.

Side frame 18 includes a dog leg portion 46, and side frame 20 includes a bump 48 and screw 50 to complete the geometry of the folding saw. As is evident in FIGS. 2, 3 and 4, the screw 50 engages the underside of the back channel 12 when the saw is fully extended in FIG. 4. The saw blade can completely retract into the back channel 12 and handle 10 without any disassembly and extend for use without any assembly in a manner analogous to a folding knife. The screw 50 provides a tension adjustment for the saw blade 22.

To retain the saw fully retracted or fully extended, latches 28 and 30 are provided. Top latch 28 is pivotally attached to back channel 12 with a spring hinge 52. Top latch 28 is urged against the handle 10, as shown in FIGS. 2 and 3 and latches both the saw in the fully extended position and the handle in the fully extended position, as shown in FIG. 4. Blade latch 30 also latches the saw in the fully extended position, as shown in FIGS. 1, 4 and 5 by engaging both side frame 20 and handle 10. Latch 30 is attached to the back frame 12 by a spring hinge 54, as best shown in FIG. 5. Because the saw blade 22 and four-bar linkage are subjected to considerable stress in use, the blade latch 30 folds downward, out of the way, as best shown in FIG. 3, when the saw is being folded or unfolded but folds upward, at the urging of the spring hinge 54, as shown in FIGS. 1, 2, 4 and 5 to tightly engage side frame 20 and handle 10, as shown best in FIG. 5.

What is claimed is:

1. A folding saw comprising a back and a handle pivotably attached to the back,
   a pair of side frames pivotably attached to the back and including means for pivotal attachment of a saw blade,
   a back frame pivotably attached to one side frame, and a handle link pivotably attached to the back frame and the handle,
   whereby movement of the handle relative to the back into position for sawing extends the side frames into sawing position and movement of the handle away from the sawing position retracts the side frames into the back and handle.

2. The folding saw of claim 1, including a saw blade attached by the means for pivotal attachment, the saw blade being retractable into the back with the side frames.

3. The folding saw of claim 1, including a latch on the saw, said latch having means adapted to retain the saw in the extended position.

4. The folding saw of claim 1, including a latch on the saw, said latch having means adapted to retain the saw in the retracted position.

5. The folding saw of claim 1, including a first latch on the saw, said first latch having means adapted to engage the handle in the extended position and in the retracted position.

6. The folding saw of claim 5, including a second latch having means adapted to engage the handle in the extended position.

7. The folding saw of claim 6 wherein the second latch includes means to engage at least one side frame in the extended position.

8. The folding saw of claim 5, including a second latch having means adapted to engage at least one side frame in the extended position.

9. The folding saw of claim 1, including a latch on the saw, said latch having means adapted to engage at least one side frame in the extended position.

10. The folding saw of claim 9 wherein said latch includes means to engage the handle in the extended position.

11. The folding saw of claim 1, including a latch on the saw, said latch having means adapted to engage the handle in the extended position.

12. The folding saw of claim 1, including adjustment means on at least one frame, said adjustment means adapted to apply adjustable tension to a blade on the saw.

13. The folding saw of claim 12 wherein the adjustment means engages the back of the saw.

14. The folding saw of claim 1 wherein the back of the saw is formed in a channel shape.

15. A folding saw comprising a back and a handle pivotably attached to the back,
   a pair of side frames pivotably attached to the back and including means for pivotal attachment of a saw blade,
   a back frame pivotably attached to one side frames and a handle link pivotably attached to the back frame and the handle,
   a top latch adapted to retain the handle in the retracted position, and
   a bottom latch adapted to retain at least one side frame in the extended position.

16. The folding saw of claim 15 wherein the bottom latch includes means to retain the handle in extended position.

17. The folding saw of claim 15, including adjustment means on at least one frame, said adjustment means adapted to apply adjustable tension to a blade on the saw.

18. The folding saw of claim 17 wherein the adjustment means engages the back of the saw.

* * * * *